US011854119B2

(12) United States Patent
Khodadadeh et al.

(10) Patent No.: US 11,854,119 B2
(45) Date of Patent: Dec. 26, 2023

(54) AUTOMATIC OBJECT RE-COLORIZATION

(71) Applicant: Adobe Inc., San Jose, CA (US)

(72) Inventors: Siavash Khodadadeh, Orlando, FL (US); Zhe Lin, Fremont, CA (US); Shabnam Ghadar, Menlo Park, CA (US); Saeid Motiian, San Francisco, CA (US); Richard Zhang, San Francisco, CA (US); Ratheesh Kalarot, San Jose, CA (US); Baldo Faieta, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 294 days.

(21) Appl. No.: 17/155,570

(22) Filed: Jan. 22, 2021

(65) Prior Publication Data

US 2022/0237830 A1 Jul. 28, 2022

(51) Int. Cl.
*G06N 3/08* (2023.01)
*G06T 7/90* (2017.01)
*G06N 3/045* (2023.01)
*G06T 11/00* (2006.01)

(52) U.S. Cl.
CPC ............ *G06T 11/001* (2013.01); *G06N 3/045* (2023.01); *G06N 3/08* (2013.01); *G06T 7/90* (2017.01)

(58) Field of Classification Search
CPC ......... G09G 2300/0452; G09G 3/2003; G09G 3/3225; H01L 27/3216; H01L 27/3218; H01L 27/3276; H01L 27/32; H01L 27/3211; H01L 27/3213; H01L 27/326; H01L 27/3262; G06N 3/045; G06N 3/047; G06N 3/08; G06N 3/088; G06T 11/001; G06T 2200/24; G06T 7/90
See application file for complete search history.

(56) References Cited

U.S. PATENT DOCUMENTS 10,402,689 B1 * 9/2019 Bogdanovych ... G06F 18/24765
10,846,889 B2 * 11/2020 Phogat ..................... G06T 7/90
11,158,090 B2 * 10/2021 Mohandoss .......... G06V 10/774
(Continued)

OTHER PUBLICATIONS

Mahmoud Afifi,"Image Recoloring Based on Object Color Distributions,"Eurographics 2019/ P. Cignoni and E. Miguel, pp. 33-34.*
(Continued)

*Primary Examiner* — Omar S Ismail
(74) *Attorney, Agent, or Firm* — NICHOLSON DE VOS WEBSTER & ELLIOTT LLP

(57) ABSTRACT

Embodiments are disclosed for automatic object re-colorization in images. In some embodiments, a method of automatic object re-colorization includes receiving a request to recolor an object in an image, the request including an object identifier and a color identifier, identifying an object in the image associated with the object identifier, generating a mask corresponding to the object in the image, providing the image, the mask, and the color identifier to a color transformer network, the color transformer network trained to recolor objects in input images, and generating, by the color transformer network, a recolored image, wherein the object in the recolored image has been recolored to a color corresponding to the color identifier.

20 Claims, 12 Drawing Sheets
(3 of 12 Drawing Sheet(s) Filed in Color)

(56) References Cited

U.S. PATENT DOCUMENTS

| | | | |
|---|---|---|---|
| 2010/0092085 A1* | 4/2010 | Marchesotti | G06T 11/60 |
| | | | 382/254 |
| 2014/0002479 A1* | 1/2014 | Muijs | G06T 5/007 |
| | | | 345/589 |
| 2018/0336669 A1* | 11/2018 | Mertens | H04N 5/265 |
| 2019/0114752 A1* | 4/2019 | Fors | G06T 5/50 |
| 2019/0355155 A1* | 11/2019 | Shugrina | G06T 11/001 |
| 2020/0159936 A1* | 5/2020 | Anderson | G06T 19/20 |
| 2020/0364562 A1* | 11/2020 | Khoreva | G06N 3/045 |
| 2020/0372351 A1* | 11/2020 | Chang | G06V 10/764 |
| 2021/0012114 A1* | 1/2021 | Newman | G06V 20/182 |
| 2021/0124977 A1* | 4/2021 | Panetta | G06V 10/40 |
| 2021/0233287 A1* | 7/2021 | Kumar | G06T 7/90 |
| 2021/0303927 A1* | 9/2021 | Li | G06V 10/764 |
| 2022/0019343 A1* | 1/2022 | Duan | G06F 3/04883 |

OTHER PUBLICATIONS

Liron Yatziv,"Fast Image and Video Colorization Using Chrominance Blending,"May 24, 2005, IEEE Transactions On Image Processing, vol. 15, No. 5, May 2006, pp. 1120-1128.*

Dapeng Du,"Translate-to-Recognize Networks for RGB-D Scene Recognition,"Jun. 2019, Proceedings of the IEEE/CVF Conference on Computer Vision and Pattern Recognition (CVPR), 2019, pp. 11836-11838.*

Saeed Anwar,"Image Colorization: A Survey and Dataset,"Jan. 27, 2022. , Computer Vision and Pattern Recognition (cs.CV); https://doi.org/10.48550/arXiv.2008.10774,pp. 1-12.*

Richard Zhang,"Real-Time User-Guided Image Colorization with Learned Deep Priors," May 8, 2017, Computer Vision and Pattern Recognition(cs.CV),https://doi.org/10.48550/arXiv.1705.02999,pp. 1-10.*

Gong, H. et al., "Simple Primary Colour Editing for Consumer Product Images," arXiv:2006.03743v1, Jun. 6, 2020, 8 pages.

Zhang, R. et al., "Real-Time User-Guided Image Colorization with Learned Deep Priors," arXiv:1705.02999v1, May 8, 2017, 11 pages.

* cited by examiner

AUTOMATIC OBJECT RE-COLORIZATION

BACKGROUND

Color manipulation is an active field of study that aims to transform the RGB values of an image to convey a novel artistic vision or achieve the goals of the customer. While manipulating colors has a long history in painting and photography, in recent years highly innovative new approaches emerged that combine image editing and color manipulation to enable color transfer, style transfer, and appearance transfer. However, current techniques for colorization typically require significant user input. For example, a user has to select all the pixels that should change color. As a result, changing the color of a particular object in an image requires selecting all of the pixels of that object in the image.

Most conventional approaches for recoloring images involve a twostep, palette-based model. The first step extracts a palette from the image while the second step finds a mapping based on the target color (or target palette) to be applied to every pixel within the image. Additionally, deep learning-based recoloring techniques have been used to identify object color and employ palette mapping to recolor scenes. The conventional approaches are attractive since they usually do not need training examples and can be applied in high-resolution images. However, they may also change some colors that should not be changed. Deep learning techniques, instead, can only change the color of interest but they need some training data and can be only performed in low-resolution images. Both techniques require significant user involvement to achieve acceptable results.

These and other problems exist with regard to re-colorization in electronic systems.

SUMMARY

Introduced here are techniques/technologies that perform automatic object re-colorization. Automatic object re-colorization can be used to change the color of specific objects in image data. In particular, in one or more embodiments, the disclosed systems and methods use a fully automatic color transformer (FACT) network to automatically recolor a specified object in an input image. From the user's perspective, they provide an image and a recolor command such as "recolor <object tag> to <color>." A mask for the indicated object is extracted from the image, and the image, the mask, and the target color are provided to the fully automatic color transformer network which generates the recolored image.

The fully automatic color transformer network is trained as part of a generative adversarial network (GAN) to recolor objects when given the mask and target color. The GAN includes a generator network (e.g., the fully automatic color transformer network) which generates a recolored image in which a selected object is recolored to a target color. The recolored image and target color, and the original image and original color, are provided to a paired discriminator network which determines whether the pairs of inputs match. The paired discriminator and the generator are trained based on the determination of the paired discriminator. Once training is complete, the trained generator network (e.g., the fully automatic color transformer network) can be used to recolor objects in input images based on recolor commands received from a user.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

Figure 1:
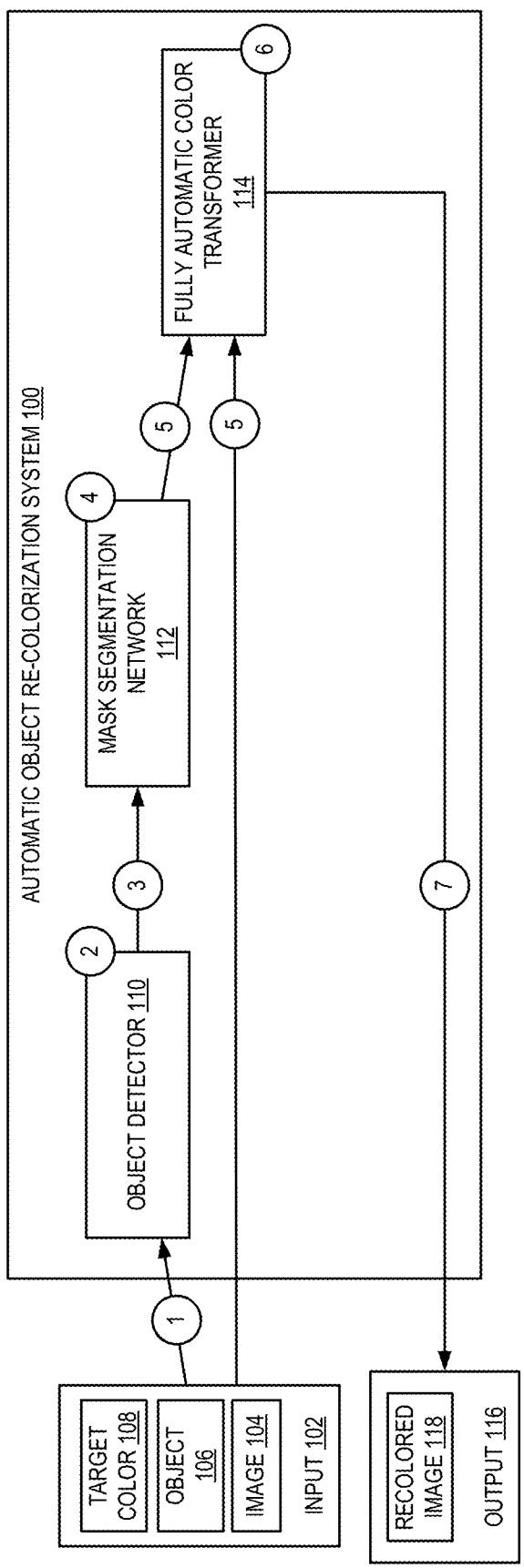
FIG. 1 illustrates a diagram of a process of automatic object re-colorization in accordance with one or more embodiments.

Automatic object re-colorization enables a user to change the color of an object in a given image with one click. With automatic object re-colorization, the user can change the color of a particular object within an image with no manual edits required. This is useful for users searching for images that depict an object of a particular color. Rather than having to find a matching image, any image that depicts the object can be automatically recolored such that the object is of the desired color.

Traditional re-colorization techniques include conventional techniques and deep learning-based techniques. The conventional techniques typically include extracting a palette from the image and then finding a mapping based on the target color (or target palette) to be applied to every pixel within the image. For example, these techniques can be used to identify a primary color in an image and then map the primary color to a target color. Although this can be effective with some images, it is inconsistent across images and typically requires significant user input and domain knowledge to adjust the settings appropriately for any particular image. The deep learning-based techniques can involve a variety of approaches. For example, the user may provide a greyscale image and the RGB value of some of the pixels. The network takes the user color input and the grayscale image and generates a colored image. Other techniques perform semantic segmentation from each image and then cluster the possible color of an object using segmentation masks. For example, the sky can be blue (daytime), yellow/red (dusk/dawn), and dark (nighttime). The scene can then be recolored using palette mapping between these masks. Although these deep learning-based techniques can be effective at changing the color of interest, they need specific training data and can be only performed on low-resolution images.

Unlike prior techniques which require substantial user input, embodiments enable re-colorization to be performed based on simple commands. One or more embodiments of the present disclosure include a fully automatic color transformer (FACT) which enables automatic re-colorization of a particular object or objects in an image based on simple recolor commands received from the user. For example, a user can give commands of the form recolor <object> to <color> which will be executed without further manual input. Embodiments use pre-trained object detectors and saliency mask segmentation networks. When a recolor command is received for a given image, the object detector can identify the object from the command in the image, and the segmentation network can generate a segmented mask of the given object. This mask, the target color and the original image form the input to the color transformer. The color transformer outputs a recolored image in which the object has been recolored to the target color.

In some embodiments, the color transformer is based on a generative adversarial network (GAN). The GAN includes a generator network which generates a recolored image in which a selected object is recolored to a target color. The recolored image and target color, and the original image and original color, are provided to a paired discriminator network which determines whether the pairs of inputs match. For example, if the paired discriminator receives an image of an azure bicycle and an azure color tag and a green bicycle and a green color tag, then the paired discriminator outputs a positive value since each input image matches its associated color tag. If, however, either the objects of the two images do not match or if the color associated with either object does not match, then the paired discriminator outputs a negative value. An adversarial loss is calculated based on the output of the paired discriminator to train the discriminator and generator networks. Additionally, the generator network can be trained on a cycle loss, where the generator is used to recolor the input training image to a new target color and then recolor the recolored image back to its original color. The cycle loss is calculated based on a difference between the original image and the image that has been recolored to the original color.

Once trained, the generator network is the color transformer network and can recolor an object in an input image to a target color. In some embodiments, the color transformer network may be deployed as part of an automatic object re-colorization system. The automatic re-colorization system may be implemented in a digital design application, a document management application, a stock image search system, or other system or service. The color transformer network returns a recolored image with the requested object recolored to the target color, but without otherwise altering the rest of the input image, changing the color palette, etc. Unlike prior systems, this recoloring is performed based on minimal input from the user. For example, the user provides the input image and a simple command indicating the object to be recolored and the target color, and the color transformer network returns the recolored image.

FIG. 1 illustrates a diagram of a process of automatic object re-colorization in accordance with one or more embodiments. As shown in FIG. 1, an automatic object re-colorization system 100 can receive a user input 102 at numeral 1, which may include an image 104, an object tag 106, and a target color 108. In some embodiments, the automatic object re-colorization system 100 may be implemented in a digital design application in which a user may load an image to be edited and then provide a re-colorization command. For example, the digital design application may include a user interface element through which the user may enter the object tag (e.g., a name of the object, or other identifier) and the target color 108.

At numeral 2, the input image 104 can be provided to an object detector 110 which identifies one or more objects depicted in the image. In some embodiments, the object detector 110 may include a neural network trained to identify a plurality of object types in images and identify a bounded area of the image in which the identified object(s) appear. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

At numeral 3, the image and the resulting bounding boxes identified by object detector 110 can be provided to mask segmentation network 112. Mask segmentation network 112 may be a neural network trained to generate a segmentation mask (e.g., a binary mask identifying pixels corresponding to an object). At numeral 4, the mask segmentation network 112 generates a segmentation mask for the identified object obtained from object detector 110.

At numeral 5, fully automatic color transformer 114 (also referred to herein as a color transformer network) obtains the segmentation mask from mask segmentation network 112, the original input image 104, and the target color 108. The objective of the fully automatic color transformer 114 is to transform the original image into the recolored image. The object to be recolored and the desired color is provided to the network in form of the segmentation mask and a color mask, respectively. In some embodiments, the color mask is generated using the segmentation mask and the target color. For example, in some embodiments, the color mask M is created as follows. Given an image $I \in [0,255]^{H \times W \times 3}$, a soft mask (e.g., segmentation mask) $S \in [0,1]^{H \times W \times 1}$, and an RGB value of the target color, a matrix of zeros with four channels of the shape (h, w, 4) is generated. The values of the pixel (i,j) in M[:,:,[R, G, B]] are set to the RGB value of the target color if S[i; j]>0. The last channel of M includes a copy of the segmentation mask S, which is useful if the target color is black. In some embodiments, the fourth channel including the segmentation mask may be added only when the target color is black. Alternatively, the color mask can always include the four channels described above, regardless of color. Although a four channel mask is described, embodiments may be used with color masks of more or fewer channels depending on implementation. Additionally, alternative color models (e.g., instead of RGB) may alternatively be used depending on implementation.

At numeral 6, the fully automatic color transformer 114 generates a recolored image using the input image, the segmentation mask, and the color mask. In some embodiments, the fully automatic color transformer 114 may include the trained generator network of a generative adversarial network (GAN) which has been trained using adversarial learning to recolor objects in images. Adversarial learning refers to a machine-learning algorithm (e.g., generative adversarial network or adversarial discrimination neural network) where opposing learning models are learned together. For example, a "generative adversarial neural network" (or simply "generative adversarial network" (GAN)) includes a generator network and a discriminator network (e.g., an "adversarial discrimination neural network"). In particular, the term "adversarial learning" includes solving a plurality of learning tasks in the same model (e.g., in sequence or in parallel) while utilizing the roles and constraints across the tasks. In some embodiments, adversarial learning includes employing one or more loss functions which are minimized with respect to one model and maximized with respect to the adversarial model.

At numeral 7, the output 116 is returned. The output may include recolored image 118 in which the object 106 depicted in the input image 104 has been recolored to the target color 108. The output 116 may be returned by displaying it in a digital design application, storing it in a designated storage location, or otherwise making the recolored image 118 available to the user who requested the input image be recolored or another user or entity.

Figure 2:
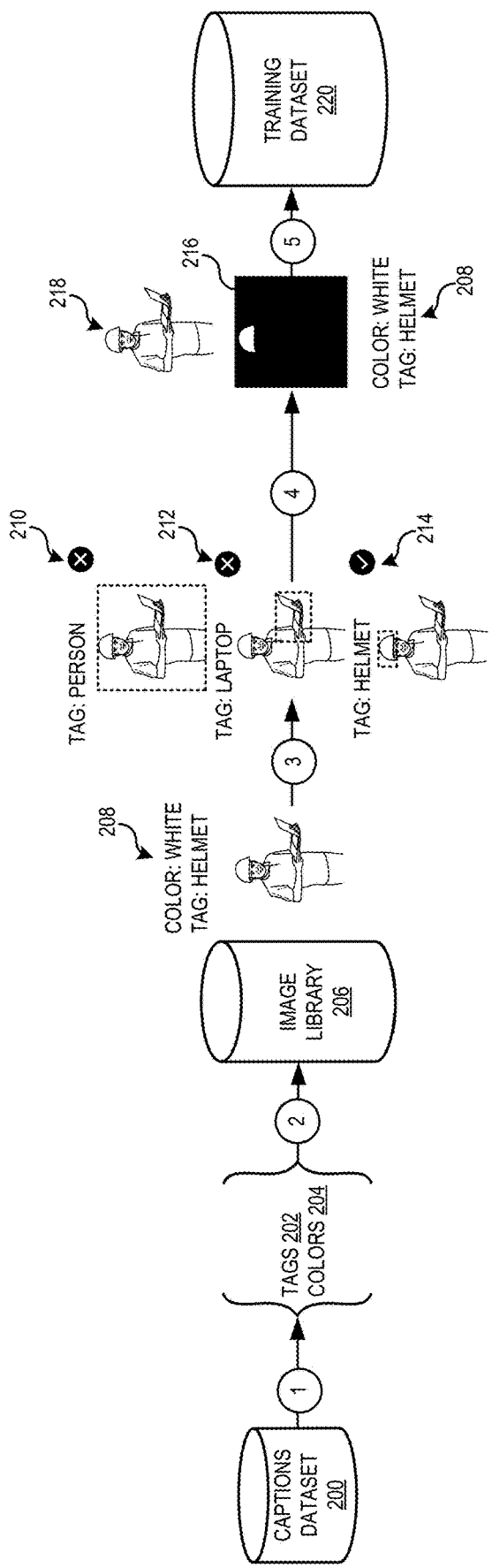
FIG. 2 illustrates a diagram of training dataset generation in accordance with one or more embodiments.

FIG. 2 illustrates a diagram of training dataset generation in accordance with one or more embodiments. As discussed, one challenge of deep learning-based techniques is obtaining a training dataset to use to train the re-colorization model being used. An ideal training dataset to train an object recoloring network using supervised learning would include of pairs of images, identical except the color of the target object. Collecting such a dataset from real-world images is very difficult—it would require an extraordinarily degree of effort from the photographer even in the case of static objects, and it is essentially impossible to achieve for pictures depicting humans. Embodiments use a technique which can learn recoloring without requiring paired images of the same scene.

As shown in FIG. 2, initially a caption dataset 200 is obtained. The caption dataset includes a list of captions commonly used with images (such as stock images), from these captions, pairs of object tags 202 and colors 204 are identified in those captions at numeral 1. In some embodiments, a preprocessing step may be performed on the captions to account for variations in spelling and overlapping meanings (e.g., replacing "reddish" with "red", etc.). These tag/color pairs are then used to search an image library 206 at numeral 2. The image library 206 can include a stock image library, an image search service, image database, or other image repository. As shown in FIG. 2, the image library 206 can be searched for the tag/color pair helmet/white 208 resulting in a plurality of image results.

At numeral 3, object detection can be applied to these image results. This may be performed using object detector 110 or other object detection technique(s). Any given image may include a plurality of objects which may be identified by the object detector. For example, a first image that depicts a person wearing a helmet and carrying a laptop may be identified as including a person 210, a laptop 212, and a helmet 214. In this example, because a match is found to helmet, the image is retained. In some embodiments, the object detector may detect a large number of objects in a given image. In such instances, the image is retained if the object tag matches with an object detected by the object detector with a confidence score over a threshold value. Alternatively, the image is retained if the object tag matches with one of the top X objects (e.g., top three, top five, top ten, etc.). If no object matching the object tag used in the query is identified, then the image is discarded. For each image that is retained, at numeral 4 a segmentation mask of the identified object is generated (for example, using mask segmentation network 112, or other image segmentation or mask generation technique(s)). If there are multiple objects with the same tag in a given image, then the object with the highest detection confidence score is used for generating the segmentation mask.

At numeral 5, the object tag and color pair 208 used to search the image library, the image 218 retained from that search, and the generated segmentation mask 216 are added to training dataset 220. As a result, the training dataset 220 D=$\{x_i, t_i, c_i, m_i\}$, such that $x_i, t_i, c_i, m_i$ are 256×256×3 image, object tag, color, and 256×256 soft mask for item i∈ $\{1, \ldots, M\}$.

Figure 3:
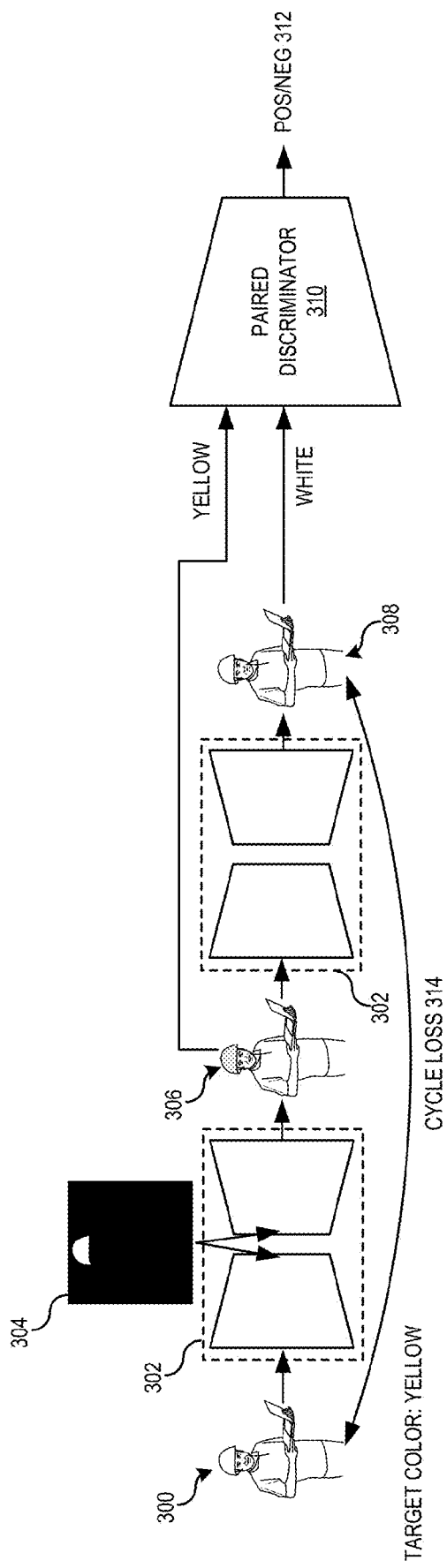
FIG. 3 illustrates a diagram of training a GAN to perform automatic object re-colorization in accordance with one or more embodiments.

FIG. 3 illustrates a diagram of training a GAN to perform automatic object re-colorization in accordance with one or more embodiments. As shown in FIG. 3, during training an image 300 can be sampled from the training dataset 220 and a target color can be selected randomly. The image 300 is provided to generator network 302 along with the mask and target color 304. As discussed further below, in some embodiments, the image, mask, and target color information can be provided together as input to the generator. Alternatively, the image 300 can be provided as input to the generator, and the mask and target color can be concatenated with features of one or more layers of the encoder and decoder of the generator network.

The output of the generator is recolored image 306, in which the object corresponding to the mask has been recolored to the target color. For example, in the embodiment shown in FIG. 3, the helmet has been recolored to the target color yellow. The recolored image is provided as input to a paired discriminator network 310 along with a color tag. The paired discriminator network receives the recolored image and recolored color tag and compare that pair to the original image along with the original color tag and output a positive value if each pair matches or a negative value if either pair does not match. However, by adding cycle consistency loss, the quality of the recoloration can be improved. For example, as shown in FIG. 3, the recolored image 306 can be input to the generator network 302 again with a target color of the original color. Ideally, the resulting recolored image 308 should be the same as the original image 300. By comparing the original image 300 to this recolored image 308, the generator can be further trained based on a cycle consistency loss (also referred to as "cycle loss").

We denote our color transform network with $\mathcal{G}$ and our discriminator with $\mathcal{D}$. During training, positive and negative pairs of object tags and colors are generated. For an anchor data point $\{x_i, t_i, c_i, m_i\}$, we sample a positive data point, $\{x_p, t_p, c_p, m_p\}$, such that $t_i=t_p$. One option to obtain negative pairs is to sample $\{x_n, t_n, c_n, m_n\}$ such that $t_i \neq t_p$. The other option is to sample two data points with the same tag and falsify their colors. The color of anchor, negative data point, or both can be falsified. In some embodiments, random cropping is applied on $x_i$, $x_p$, $x_n$.

As discussed, the paired discriminator takes two images and their corresponding color masks and determines if the two images have the same tag, and their color masks match the actual objects' colors. For example, the discriminator outputs 'one' if the inputs are an azure bicycle with an azure mask and a green bicycle with a green mask (e.g., a "positive pair"). The paired discriminator outputs 'zero' if the inputs are an azure bicycle with an azure mask and a black bear with a black mask since the object tags between the two images are different (e.g., a "negative pair"). It also outputs 'zero' if the inputs are an azure bicycle with an azure mask and a green bicycle with a black mask since one of the color masks are wrong (e.g., a negative pair).

Therefore, this binary classification can be formulated as:

$$\mathcal{L}_0 = \mathbb{E}[\log(\mathcal{D}((x_i,m_i,c_i),(x_i^p,m_i^p,c_i^p)))] + \mathbb{E}[\log(1-\mathcal{D}((x_i,m_i,c_i),(x_i^n,m_i^n,c_i^n)))]$$

where $x_i^p$, $m_i^p$, $c_i^p$ is a triplet of image-mask-color from possible positive set for $x_i$ and $x_i^n$, $m_i^n$, $c_i^n$ is a triplet of image-mask-color from possible negative set for $x_i$.

Therefore, the adversarial loss looks like:

$$\mathcal{L}_1 = \mathcal{L}_0 + \mathbb{E}[\log(1-\mathcal{D}((x_i,m_i,c_i),(x_i^t,m_i,c_t)))]$$

where $c_t \in \{c_1, c_2, \ldots, c_{max}\}$ is randomly drawn from the color set (which may include up to $c_{max}$ number of colors) and $x_i^t = \mathcal{G}(x_i, m_i, c_t)$ is the recolored image. Additionally, cycle consistency is used to get the original image back:

$$\mathcal{L}_2 = \mathcal{L}_0 + \mathbb{E}[\|x_i - \hat{x}_i\|_1] + \mathbb{E}[\log(1-\mathcal{D}((x_i,m_i,c_i),(\hat{x}_i,m_i,c_i)))]$$

where $\hat{x}_i = \mathcal{G}(x_i^t, m_i, c_i)$ and $x_i^t = \mathcal{G}(x_i, m_i, c_t)$.

An additional identity loss is also calculated. For the $i^{th}$ image with color if it is recolored with then the same image should also be obtained. Therefore, a reconstruction loss can be represented as:

$$\mathcal{L}_3 = \mathbb{E}[\|x_i - \mathcal{G}(x_i, m_i, c_i)\|_1]$$

Also, the recolored image should be the same as the input image everywhere except inside its mask. Therefore, another reconstruction loss can be added as follows:

$$\mathcal{L}_4 = \mathbb{E}[\|x_i - \mathcal{G}(x_i, m_i, c_t) \circ (1-m_i)\|_1]$$

where ○ represents pixel-wise product.

The full objective is the summation of the losses described above:

$$\mathcal{L}(\mathcal{G},\mathcal{D}) = \lambda_1 \cdot \mathcal{L}_1 + \lambda_2 \cdot \mathcal{L}_2 + \lambda_3 \cdot \mathcal{L}_3 + \lambda_4 \cdot \mathcal{L}_4$$

where $\lambda_1$, $\lambda_2$, $\lambda_3$, $\lambda_4$ are hyper-parameters that strike a balance between the different losses. The desired fully automatic color transformer can be found by solving:

$$\mathcal{G}^* = \arg\min_{\mathcal{G}}\max_{\mathcal{D}} \mathcal{L}(\mathcal{G},\mathcal{D})$$

Figure 4:
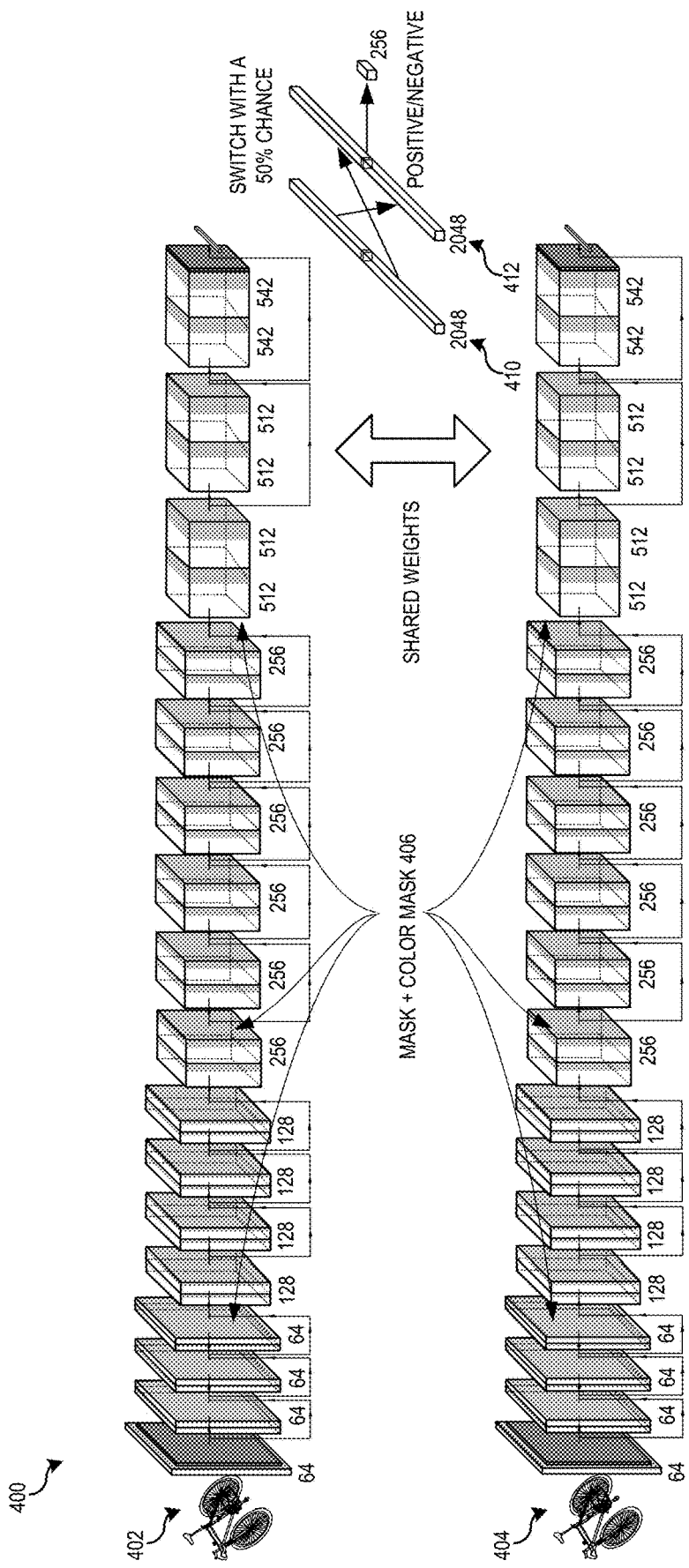
FIG. 4 illustrates a diagram of a paired discriminator network in accordance with one or more embodiments.

FIG. 4 illustrates a diagram of a paired discriminator network 400 in accordance with one or more embodiments. One way to define a discriminator is to train it with different output heads. For example, the discriminator can predict the color, and if the input image is real or fake. However, defining a domain as a label is not that straightforward (for example the domain of a particular color). Instead, embodiments use a paired discriminator 400 which looks at two images at the same time and as a result can make better decisions. The paired discriminator network 400, in some embodiments, has a shared visual feature extractor which is similar to ResNet50 with one difference being that the color masks are resized and concatenated to internal bottleneck layers as shown at 406. For example, in some embodiments, the color masks can be added at bottleneck layers 4, 5, and 6. In some embodiments, the paired discriminator 400 is initialized randomly.

Figure 5:
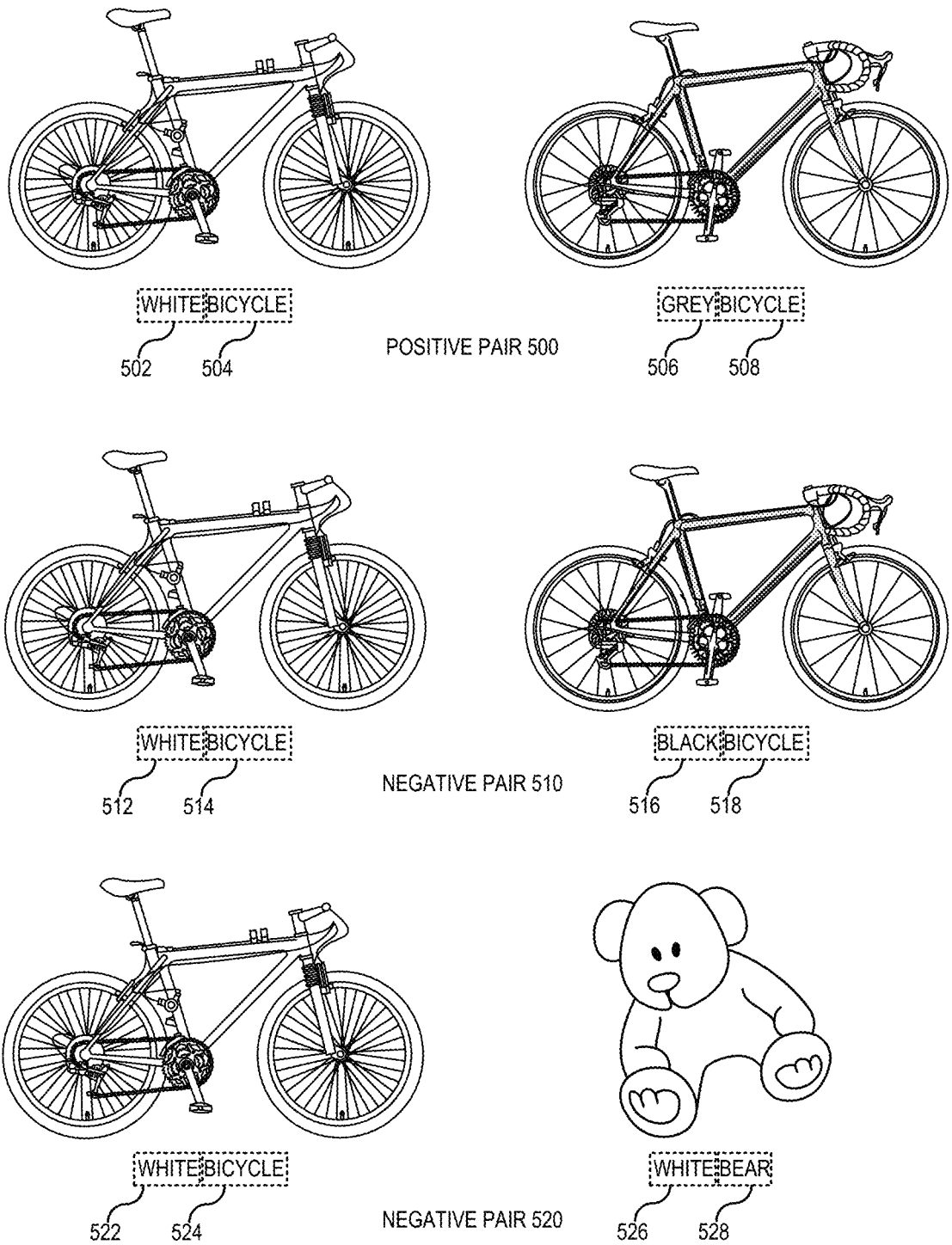
FIG. 5 illustrates example positive and negative pairs evaluated by the paired discriminator network in accordance with one or more embodiments.

As shown in FIG. 4, the paired discriminator network 400 takes a pair of images 402, 404 as input. As discussed, during training positive and negative pairs are provided to the discriminator. The output should be positive when both images are having the same object tag and their color masks are correct. When the color masks are not correct, or the images have different tags, the output should be negative. In some embodiments, the paired discriminator network switches the outputs 410, 412, with a 50% chance. This makes the paired discriminator network more robust against order of the inputs FIG. 5 illustrates example positive and negative pairs evaluated by the paired discriminator network in accordance with one or more embodiments. As shown in FIG. 5, positive pair 500 includes a pair of images that include a first image of a white bicycle with the color mask white 502 and the object tag bicycle 504, and a second image of a grey bicycle with a color mask grey 506 and the object tag bicycle 508. This is a positive pair because the object tags of both images are the same, and the color masks are correct. Negative pair 510 includes a pair of images that include a first image of a white bicycle with the color mask white 512 and the object tag bicycle 514, and a second image of a grey bicycle with a color mask black 516 and the object tag bicycle 518. This is a negative pair because although the object tags of both images are the same, the color masks are incorrect (e.g., the grey bicycle has a color mask of black). Negative pair 520 includes a pair of images that include a first image of a white bicycle with the color mask white 522 and the object tag bicycle 524, and a second image of a white bear with a color mask white 526 and the object tag bear 528. This is a negative pair because the object tags do not match.

Figure 6:
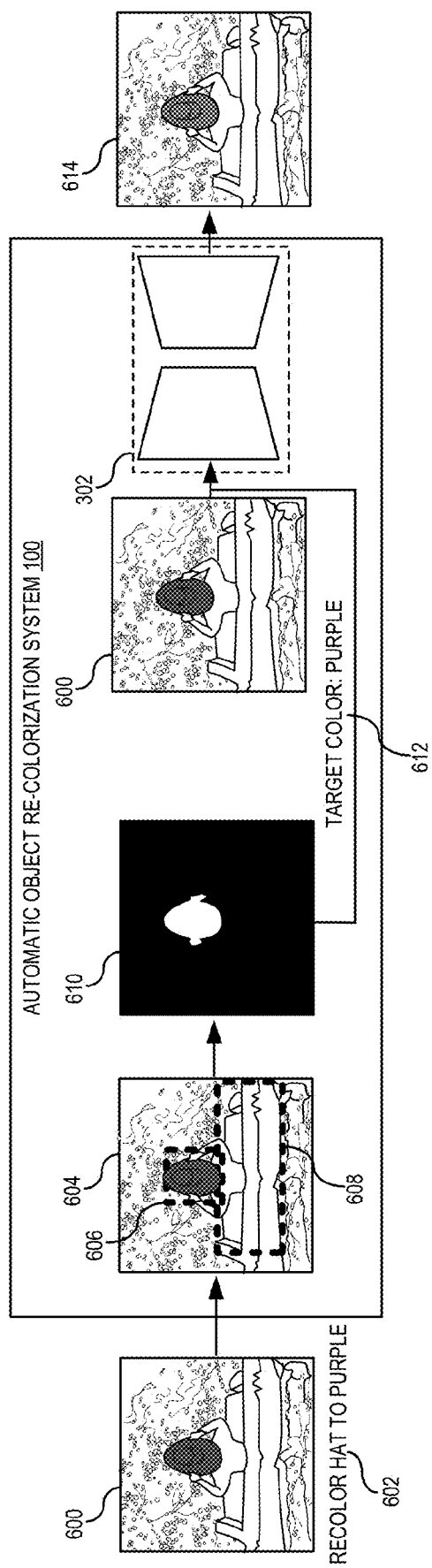
FIG. 6 illustrates a diagram of performing automatic object re-colorization using a fully automatic color transformer in accordance with one or more embodiments.

FIG. 6 illustrates a diagram of performing automatic object re-colorization using a fully automatic color transformer in accordance with one or more embodiments. As shown in FIG. 6, at test time the automatic object re-colorization system 100 receives a recolor request which includes an image 600 to be recolored and a recolor command 602. The recolor command may take the form of "recolor <tag> to <color>." For example, in FIG. 6, the recolor command 602 is to "recolor hat to purple." The input image 600 can be passed to an object detector 604 which may identify a plurality of objects in the image. For example, the hat may be identified and bounding box 606 added, and a bench may be identified and bounding box 608 added. Since a match for the object tag was found in hat, the image and corresponding bounding box 606 are used by a mask segmentation network to generate object mask 610. As shown in mask 610, the mask includes the persons hands which are gripping the hat. However, by incorporating cycle loss, as discussed above during training, the hands will not be recolored. The original image 600, mask 610, and target color 612, then are provided to the color transformer network 302 which generates the recolored image 614 with a forward pass. As shown in FIG. 6, in the recolored image only the hat has been recolored to purple.

Figure 7:
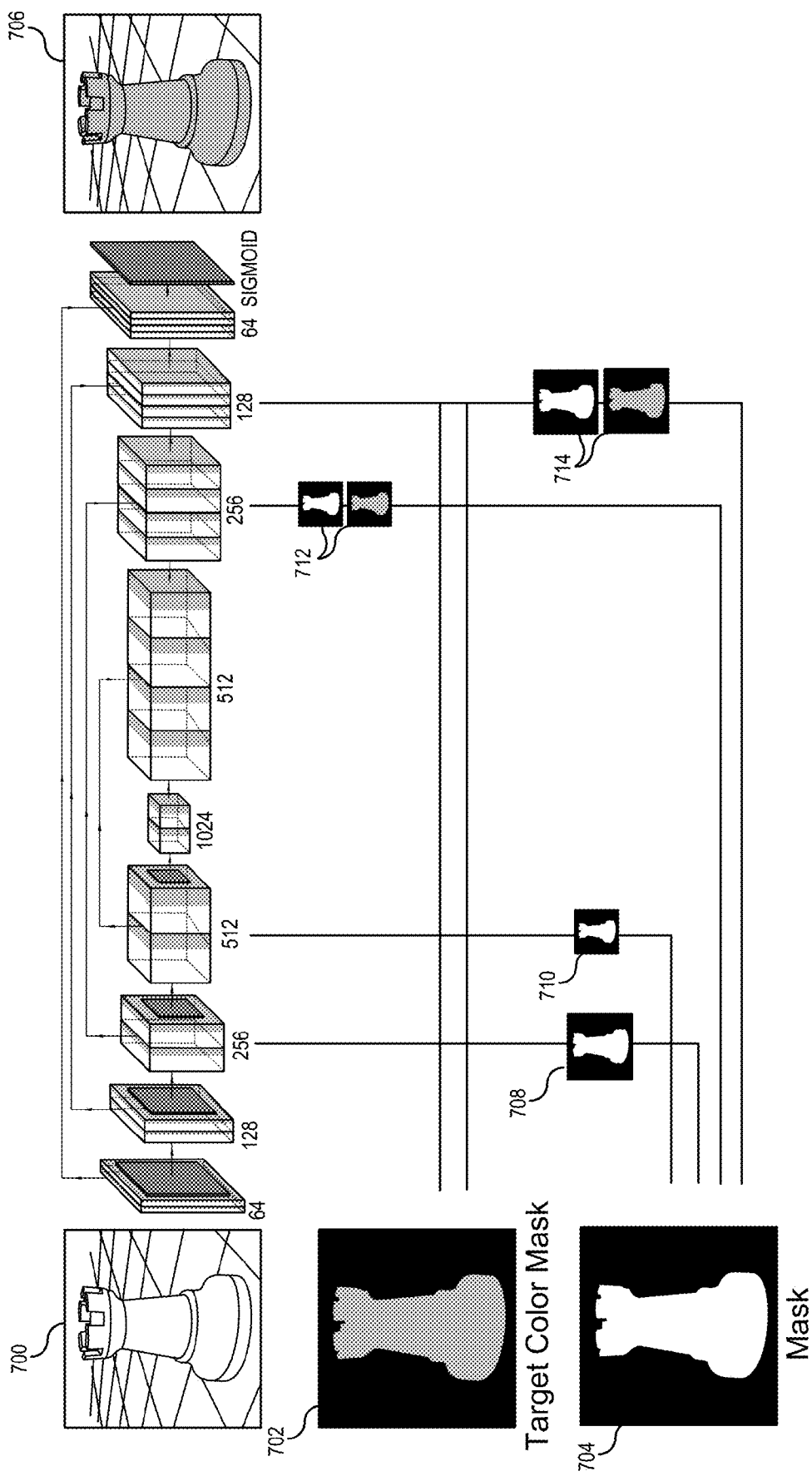
FIG. 7 illustrates a diagram of a fully automatic color transformer network in accordance with one or more embodiments.

FIG. 7 illustrates a diagram of a fully automatic color transformer network in accordance with one or more embodiments. As shown in FIG. 7, the generator network (e.g., color transformer network 302) receives an input image 700, a target color mask 702, and an object mask 704 and generates recolored image 706. The target color can be provided to the generator network by generating the target color mask, which includes four channels: R, G, B, and mask. As such, the RGB values of the target color are encoded into the channels of the target color mask and the object mask 704 is added as a fourth channel. By adding the object mask as a fourth channel, if the target color is black, then the object can still be recolored.

In some embodiments, the generator network comprises a U-Net architecture with concatenating layers from the encoder to the decoder. The object mask is resized and concatenated (e.g., object masks 708 and 710) with the internal encoder layers. Both the object mask and the target color mask are resized and concatenated (e.g., masks 712 and 714) with decoder layers. As discussed above, the masks may be added at bottleneck layers, such as layers 4, 5, and 6. However, in some embodiments, the mask information may be provided to the generator in alternative ways. For example, the masks may be added to different layers of the generator (e.g., in the encoder, decoder, or both). Alternatively, the mask information can be provided with the original input image as input to the generator.

Figure 8:
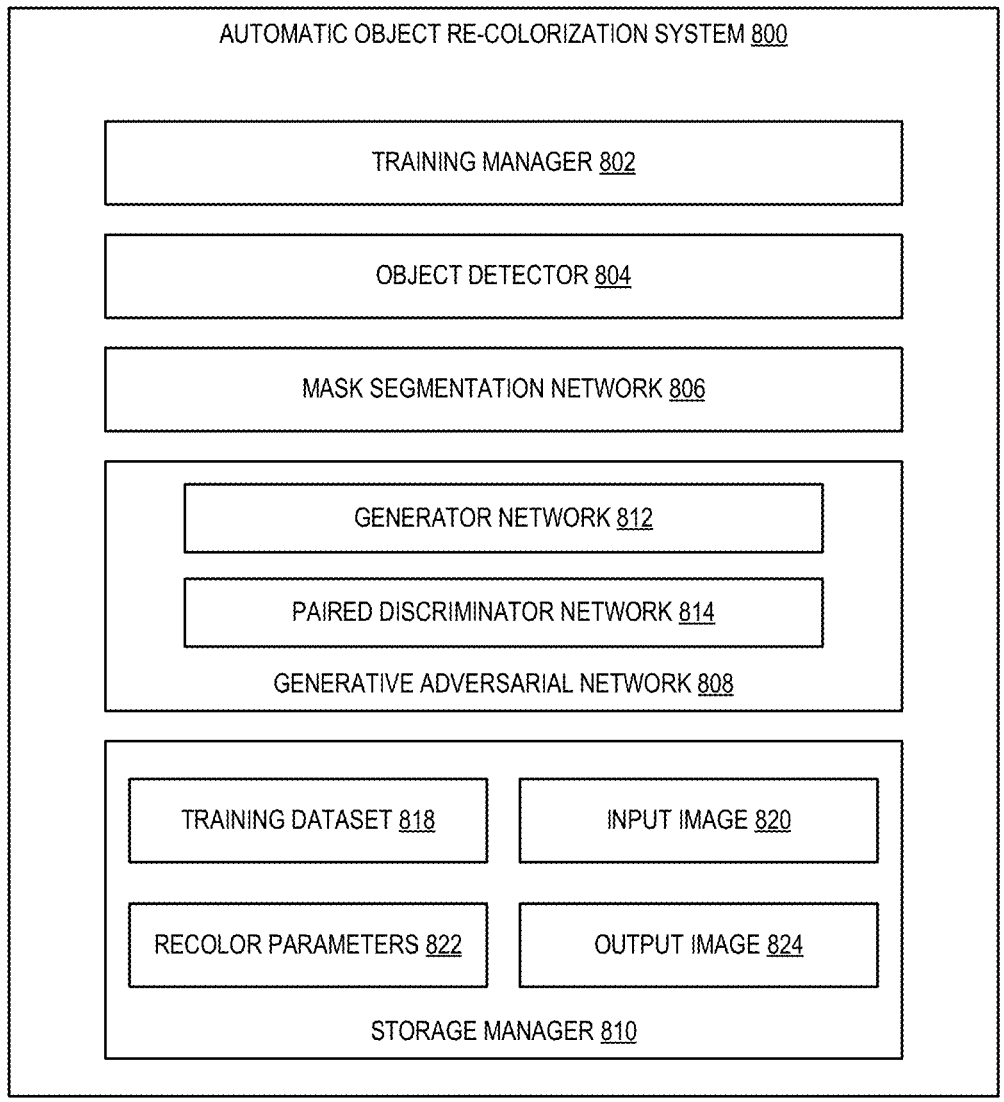
FIG. 8 illustrates a schematic diagram of an automatic object re-colorization system in accordance with one or more embodiments.

FIG. 8 illustrates a schematic diagram of an automatic object re-colorization system (e.g., "automatic object re-colorization system" described above) in accordance with one or more embodiments. As shown, the automatic object re-colorization system 800 is stored in memory as program code, data structures, etc. and includes, but is not limited to, a training manager 802, an object detector 804, a mask segmentation network 806, a generative adversarial network 808, and a storage manager 810. The generative adversarial network 808 includes a generator network 812 and a discriminator network 814. The storage manager 810 includes training dataset 818, input image 820, recolor parameters 822, and output image 824.

As illustrated in FIG. 8, the automatic object re-colorization system 800 includes a training manager 802. In particular, the training manager 802 trains a generator network to learn to recolor objects in input images when given an input image, a target color (e.g., in RGB values), and an object mask. A paired discriminator network receives pairs of images and their corresponding target color masks and outputs whether the pair is positive or negative. As discussed, a positive pair is found when the object tags of both images match, as well as the color tags and the depicted colors of the objects both match. Otherwise, the result is a negative pair. The paired discriminator and the generator are both trained based on a loss function that includes a plurality of calculated losses. As discussed above, the loss function can include a binary classification loss, an adversarial loss, a cycle loss, and an identity loss. The generator is trained by minimizing the loss for the generator and maximizing the loss for the discriminator. As a result, the generator learns to produce recolored images in which only the desired object has been recolored, and that the desired object has been recolored to the correct color.

As shown, the automatic object re-colorization system 800 includes an object detector 804. The object detector may be a machine learning model (such as a convolutional neural network (CNN) or other model). The object detector 804 may be trained to detect a plurality of classes of objects and identify their location in an image using a bounding box. The automatic object re-colorization system 800 also includes a mask segmentation network 806. The mask segmentation network may be a machine learning model (e.g., a neural network) which receives an image and an object location (e.g., a bounding box) and outputs a binary mask, where each pixel of the mask indicates the presence or absence of the object.

As shown, the automatic object re-colorization system 800 includes the generative adversarial network 808. As explained above, in one or more embodiments, the generative adversarial network 808 includes a generator network 812 and a paired discriminator network 814. The generator network 812 is a neural network trained adversarially with the paired discriminator network 814 (e.g., an adversarial discrimination neural network) to learn to generate synthetic data that is indistinguishable from a training dataset by the discriminator network. As discussed, the generator network 812 receives an image, object mask, and target color and outputs a recolored image in which only the object identified by the object mask has been recolored to the target color. The paired discriminator network 814 receives a pair of images and corresponding color tags, and outputs either a positive pair or a negative pair, as discussed above.

As illustrated in FIG. 8, the automatic object re-colorization system 800 also includes the storage manager 810. The storage manager 810 maintains data for the automatic object re-colorization system 800. The storage manager 810 can maintain data of any type, size, or kind as necessary to perform the functions of the automatic object re-colorization system 800. The storage manager 810, as shown in FIG. 8, includes the training dataset 818. The training dataset 818 can include a plurality of training tuples including a digital training image, a mask, a color tag, and an object tag, as discussed in additional detail above. In particular, in one or more embodiments, the training dataset 818 includes training tuples utilized by the training manager 802 to train GAN 808 to automatically recolor objects in input images.

As further illustrated in FIG. 8, the storage manager 810 also includes input image 820. Input image 820 can include information for any digital image utilized by the automatic object re-colorization system 800. For example, input image 820 can include a digital image of an object provided by a user, where the user seeks to recolor the object depicted in the input image. The storage manager 810 may also include recolor parameters 822. The recolor parameters 822 may include data included in one or more recolor commands provided by the user along with the input image 820. For example, the recolor command may be expressed in the form of "recolor <object> to <target color>". In this example, the recolor parameters may include the object tag provided by the user in the recolor command and the target color provided by the user in the recolor command. The target color may include the RGB values of that color or may include an identifier which is mapped to RGB values. The storage manager 810 may further include output image 824. The output image 824 may be the recolored image output by the generator network in response to a recolor command received from the user. As discussed in further detail above, the output image 824 can be substantially the same as the input image, except that the object has been recolored to the target color, based on the recolor command.

Each of the components 804-810 of the automatic object re-colorization system 800 and their corresponding elements (as shown in FIG. 8) may be in communication with one another using any suitable communication technologies. It will be recognized that although components 802-810 and their corresponding elements are shown to be separate in FIG. 8, any of components 802-810 and their corresponding elements may be combined into fewer components, such as into a single facility or module, divided into more components, or configured into different components as may serve a particular embodiment.

The components 802-810 and their corresponding elements can comprise software, hardware, or both. For example, the components 802-810 and their corresponding elements can comprise one or more instructions stored on a computer-readable storage medium and executable by processors of one or more computing devices. When executed by the one or more processors, the computer-executable instructions of the automatic object re-colorization system 800 can cause a client device and/or a server device to perform the methods described herein. Alternatively, the components 802-810 and their corresponding elements can comprise hardware, such as a special purpose processing device to perform a certain function or group of functions. Additionally, the components 802-810 and their corresponding elements can comprise a combination of computer-executable instructions and hardware.

Figure 9:
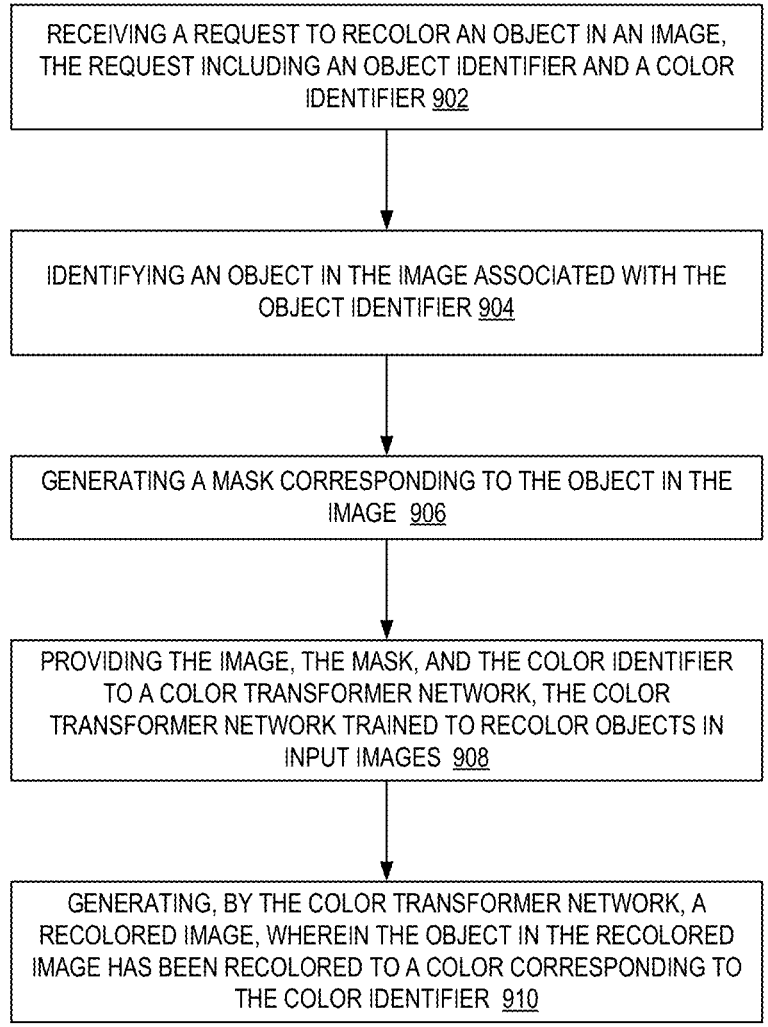
FIG. 9 illustrates a flowchart of a series of acts in a method of automatic object re-colorization in accordance with one or more embodiments.
Figure 10:
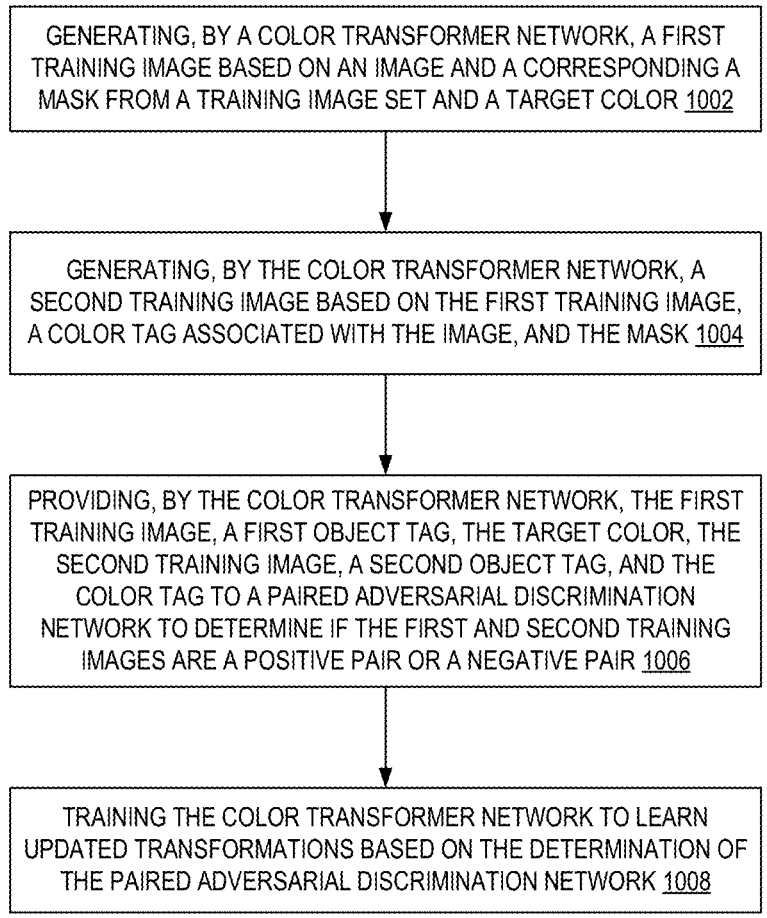
FIG. 10 illustrates a flowchart of a series of acts in a method of automatic object re-colorization in accordance with one or more embodiments.

Furthermore, the components 802-810 of the automatic object re-colorization system 800 may, for example, be implemented as one or more stand-alone applications, as one or more modules of an application, as one or more plug-ins, as one or more library functions or functions that may be called by other applications, and/or as a cloud-computing model. Thus, the components 802-810 of the automatic object re-colorization system 800 may be implemented as a stand-alone application, such as a desktop or mobile application. Furthermore, the components 802-810 of the automatic object re-colorization system 800 may be implemented as one or more web-based applications hosted on a remote server. Alternatively, or additionally, the components of the automatic object re-colorization system 800 may be implemented in a suit of mobile device applications or "apps." To illustrate, the components of the automatic object re-colorization system 800 may be implemented in a digital design application, including but not limited to ADOBE® PHOTOSHOP®, ADOBE® STOCK, ADOBE® ACROBAT®. "ADOBE®", "PHOTOSHOP®", and "ACROBAT®" are either registered trademarks or trademarks of Adobe Inc. in the United States and/or other countries. For example, the automatic object re-colorization system 800 may be integrated into a stock image service, such as ADOBE® STOCK, so a user can search for stock images and then recolor one or more objects in the stock images to suit their needs FIGS. 1-8, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of automatic object re-colorization in accordance with one or more embodiments. In one or more embodiments, the method 900 is performed in a digital medium environment that includes the automatic object re-colorization system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving, by an automatic object re-colorization system, a request to recolor an object in an image, the request including an object identifier and a color identifier. For example, the request to recolor the object in the image may include a recolor command in the form of "recolor <object> to <target color>," where <object> includes the object identifier, and <target color> include the color identifier. In some embodiments, the recolor command is provided through a graphical user interface, text interface, or other user interface. In some embodiments, the user may select the object identifier from a list of supported object classes and the target color from a list of supported colors. Alternatively, the user may input any color by RGB values (or other color model values) and any object identifier.

As illustrated in FIG. 9, the method 900 includes an act 904 of identifying, by an object detector, an object in the image associated with the object identifier. In some embodiments, the object detector may be a neural network-based object detector, trained to identify objects in images and return an object tag and bounding box coordinates. As illustrated in FIG. 9, the method 900 includes an act 906 of generating, by a mask segmentation network, a mask corresponding to the object in the image. In some embodiments, the mask segmentation network receives the input image and the bounding box coordinates from the object detector. The mask segmentation network then generates the mask for the object in the image. The mask may be a binary mask where each pixel indicates the presence or absence of the underlying object.

As illustrated in FIG. 9, the method 900 includes an act 908 of providing, by the automatic object re-colorization system, the image, the mask, and the color identifier to a color transformer network, the color transformer network trained to recolor objects in input images. In some embodiments, providing the image, the mask, and the color identifier to a color transformer network further include generating a color mask based on the mask and the color identifier, providing the image as an input to the color transformer network, resizing the mask and concatenating it with features of one or more middle layers of the encoder, and resizing the mask and the color mask and concatenating them with features of one or more middle layers of the decoder. For example, in some embodiments, the color mask includes red, blue, and green color channels corresponding to an RGB value of the color identifier. In some embodiments, when the RGB value of the color identifier corresponds to black, the color mask is concatenated with a mask channel that includes the mask. Alternatively, the color mask may always include at least four channels (e.g., RGB channels and a mask channel), regardless of the target color.

As illustrated in FIG. 9, the method 900 includes an act 910 of generating, by the color transformer network, a recolored image, wherein the object in the recolored image has been recolored to a color corresponding to the color identifier. In some embodiments, the color transformer network comprises a U-Net architecture with concatenating layers from an encoder to a decoder. In some embodiments, the color transformer network is a generator network of a generative adversarial network, the generator network trained to learn to generate images with recolored objects based on the determination of a paired discriminator network.

In some embodiments, the paired discriminator network receives a pair of images to compare, each image from the pair of images associated with a corresponding object tag and color tag, wherein the paired discriminator outputs a positive result if both color tags and object colors of their respective images match and if the object tag of each image matches, and otherwise outputs negative result, wherein the generator network is trained on an adversarial loss based on the outputs of the paired discriminator network. In some embodiments, at least one image from the pair of images is generated by the generator network from a training image by recoloring an object in the training image to generate a first recolored image and then recoloring the object in the first recolored image to an original color to generate a second recolored image, and wherein the generator network is trained on a cycle loss based on a comparison of the second recolored image and the training image.

FIG. 10 illustrates a flowchart 1000 of a series of acts in a method of automatic object re-colorization in accordance with one or more embodiments. In one or more embodiments, the method 1000 is performed in a digital medium environment that includes the automatic object re-colorization system 800. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of generating, by a color transformer network, a first training image based on an image and a corresponding a mask from a training image set and a target color. As illustrated in FIG. 10, the method 1000 includes an act 1004 of generating, by the color transformer network, a second training image based on the first training image, a color tag associated with the image, and the mask.

As illustrated in FIG. 10, the method 1000 includes an act 1006 of providing, by the color transformer network, the first training image, a first object tag, the target color, the second training image, a second object tag, and the color tag to a paired adversarial discrimination network to determine if the first and second training images are a positive pair or a negative pair.

As illustrated in FIG. 10, the method 1000 includes an act 1008 of training the color transformer network to learn updated transformations based on the determination of the paired adversarial discrimination network. In some embodiments, training further includes updating the color transformer network using an adversarial loss based on the determination of the paired discriminator network which outputs a positive result if the color tag and the target color match object colors of their respective images and if the first object tag and the second object tag match, and otherwise outputs negative result. In some embodiments, training further includes updating the color transformer network using a cycle loss based on a difference between the second training image and the image from the training image set.

In some embodiments, the method further includes acts of searching an image library using at least one object tag-color pair to obtain a first set of images, performing object detection on each image in the first set of images to identify a second set of images that match the at least one object tag-color pair, generating a mask for each image in the second set of images, and storing the training image set comprising the second set of images and a corresponding set of masks.

Figure 11:
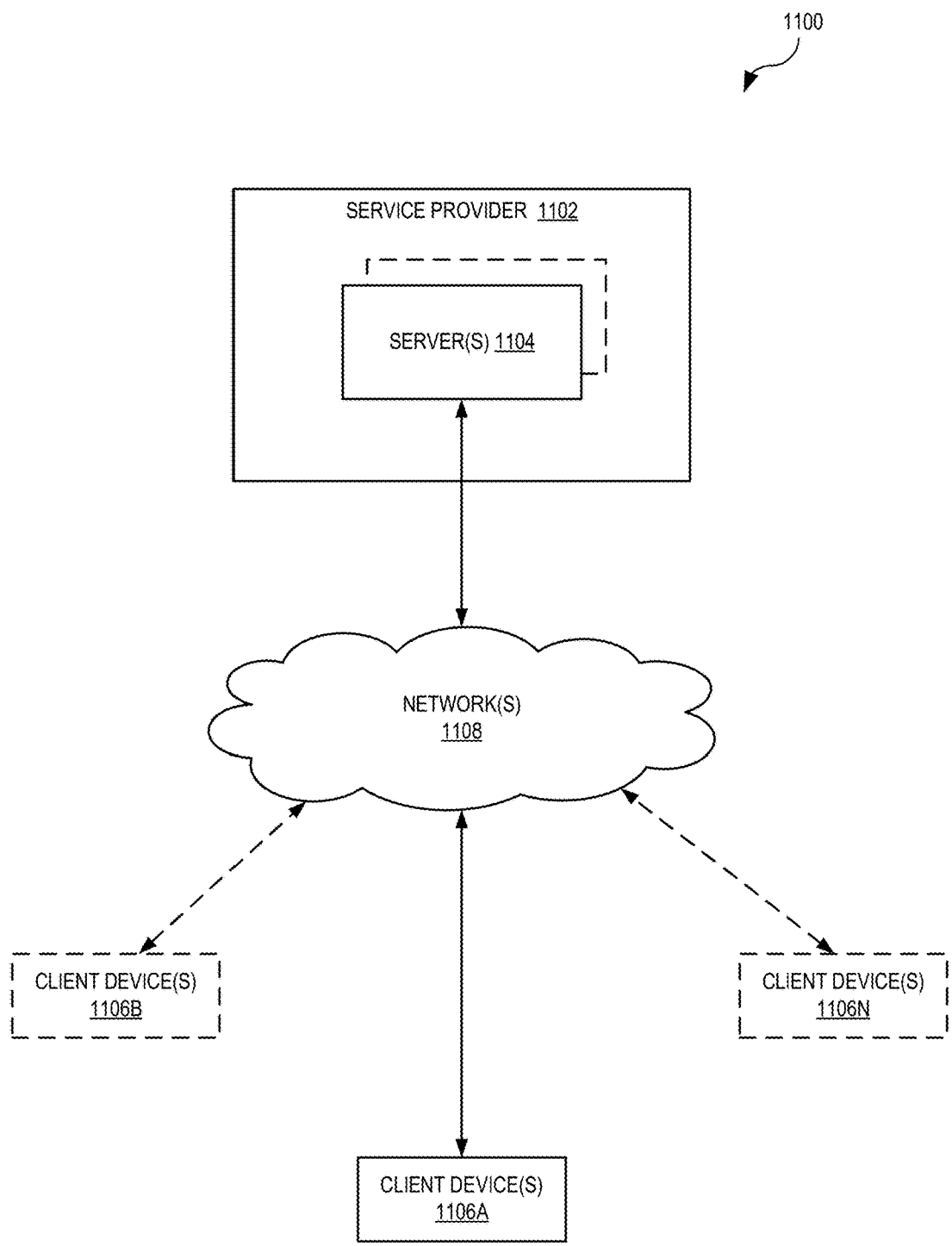
FIG. 11 illustrates a schematic diagram of an exemplary environment in which the image processing system can operate in accordance with one or more embodiments.

FIG. 11 illustrates a schematic diagram of an exemplary environment 1100 in which the automatic object re-colorization system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the automatic object re-colorization system 800. In particular, the automatic object re-colorization system 800 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including training dataset 818, input image data 820, recolor parameters 822, output image data 824, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the automatic object re-colorization system 800. In particular, the automatic object re-colorization system 800 can comprise an application running on the one or more servers 1104 or a portion of the automatic object re-colorization system 800 can be downloaded from the one or more servers 1104. For example, the automatic object re-colorization system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more digital images (e.g., the input image data 820, such as camera roll or an individual's personal photos) stored at the one or more servers 1104. Moreover, the client device 1106A can receive a request (i.e., via user input) to recolor an object in an image and provide the request to the one or more servers 1104. Upon receiving the request, the one or more servers 1104 can automatically perform the methods and processes described above to generate an output image in which the object has been recolored to the requested color. The one or more servers 1104 can provide the output image, to the client device 1106A for display to the user.

As just described, the automatic object re-colorization system 800 may be implemented in whole, or in part, by the individual elements 1102-1108 of the environment 1100. It will be appreciated that although certain components of the automatic object re-colorization system 800 are described in the previous examples with regard to particular elements of the environment 1100, various alternative implementations are possible. For instance, in one or more embodiments, the automatic object re-colorization system 800 is implemented on any of the client devices 1106A-N. Similarly, in one or more embodiments, the automatic object re-colorization system 800 may be implemented on the one or more servers 1104. Moreover, different components and functions of the automatic object re-colorization system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
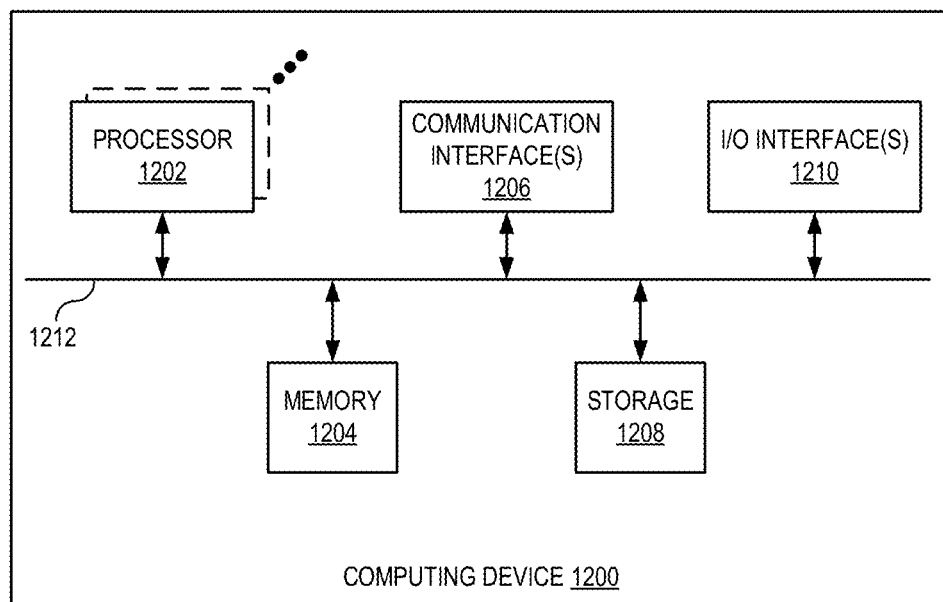
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the image processing system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
receiving a request to recolor an object in an image, the request including an object identifier and a color identifier;
identifying an object in the image associated with the object identifier;
generating a mask corresponding to the object in the image;
providing the image, the mask, and the color identifier to a color transformer network, the color transformer network trained to recolor objects in input images, wherein the color transformer network comprises a network architecture with concatenating layers from an encoder to a decoder, and wherein the mask is concatenated with features of layers of the encoder and a color mask is concatenated with features of layers of the decoder; and
generating, by the color transformer network, a recolored image, wherein the object in the recolored image has been recolored to a color corresponding to the color identifier.

2. The computer-implemented method of claim 1, wherein the network architecture comprises a U-Net architecture.

3. The computer-implemented method of claim 2, wherein providing the image, the mask, and the color identifier to a color transformer network, the color transformer network trained to recolor objects in input images, further comprises:
generating the color mask based on the mask and the color identifier;
providing the color mask as an input to the color transformer network;
wherein the mask is resized when it is concatenated with the features of the layers of the encoder, and wherein the layers of the encoder include one or more middle layers of the encoder; and
wherein the mask and the color mask are resized when they are concatenated with the features of the layers of the decoder, and wherein the layers of the decoder include one or more middle layers of the decoder.

4. The computer-implemented method of claim 3, wherein the color mask includes red, blue, and green color channels corresponding to an RGB value of the color identifier.

5. The computer-implemented method of claim 4, wherein the color mask is concatenated with a mask channel that includes the mask.

6. The computer-implemented method of claim 1, wherein the color transformer network is a generator network of a generative adversarial network, the generator network trained to learn to generate images with recolored objects based on the determination of a paired discriminator network.

7. The computer-implemented method of claim 6, wherein the paired discriminator network receives a pair of images to compare, each image from the pair of images associated with a corresponding object tag and color tag, wherein the paired discriminator outputs a positive result if both color tags and object colors of their respective images match and if the object tag of each image matches, and otherwise outputs negative result, wherein the generator network is trained on an adversarial loss based on the outputs of the paired discriminator network.

8. The computer-implemented method of claim 7, wherein at least one image from the pair of images is generated by the generator network from a training image by recoloring an object in the training image to generate a first recolored image and then recoloring the object in the first recolored image to an original color to generate a second recolored image, and wherein the generator network is trained on a cycle loss based on a comparison of the second recolored image and the training image.

9. A non-transitory computer readable storage medium including instructions stored thereon which, when executed by a processor, cause the processor to:
receive a request to recolor an object in an image, the request including an object identifier and a color identifier;
identify an object in the image associated with the object identifier;
generate a mask corresponding to the object in the image;
provide the image, the mask, and the color identifier to a color transformer network, the color transformer network trained to recolor objects in input images, wherein the color transformer network comprises a network architecture with concatenating layers from an encoder to a decoder, and wherein the mask is concatenated with features of layers of the encoder and a color mask is concatenated with features of layers of the decoder; and
generate, by the color transformer network, a recolored image, wherein the object in the recolored image has been recolored to a color corresponding to the color identifier.

10. The non-transitory computer readable storage medium of claim 9, wherein the network architecture comprises a U-Net architecture.

11. The non-transitory computer readable storage medium of claim 10, wherein providing the image, the mask, and the color identifier to a color transformer network, the color transformer network trained to recolor objects in input images, further comprises:

generating the color mask based on the mask and the color identifier;

providing the color mask as an input to the color transformer network;

wherein the mask is resized when it is concatenated with the features of the layers of the encoder, and wherein the layers of the encoder include one or more middle layers of the encoder; and wherein the mask and the color mask are resized when they are concatenated with the features of the layers of the decoder, and wherein the layers of the decoder include one or more middle layers of the decoder.

12. The non-transitory computer readable storage medium of claim 11, wherein the color mask includes red, blue, and green color channels corresponding to an RGB value of the color identifier.

13. The non-transitory computer readable storage medium of claim 12, wherein the color mask is concatenated with a mask channel that includes the mask.

14. The non-transitory computer readable storage medium of claim 9, wherein the color transformer network is a generator network of a generative adversarial network, the generator network trained to learn to generate images with recolored objects based on the determination of a paired discriminator network.

15. The non-transitory computer readable storage medium of claim 14, wherein the paired discriminator network receives a pair of images to compare, each image from the pair of images associated with a corresponding object tag and color tag, wherein the paired discriminator outputs a positive result if both color tags and object colors of their respective images match and if the object tag of each image matches, and otherwise outputs negative result, wherein the generator network is trained on an adversarial loss based on the outputs of the paired discriminator network.

16. The non-transitory computer readable storage medium of claim 15, wherein at least one image from the pair of images is generated by the generator network from a training image by recoloring an object in the training image to generate a first recolored image and then recoloring the object in the first recolored image to an original color to generate a second recolored image, and wherein the generator network is trained on a cycle loss based on a comparison of the second recolored image and the training image.

17. A computer-implemented method comprising:

generating, by a color transformer network, a first training image based on an image and a corresponding a mask from a training image set and a target color;

generating, by the color transformer network, a second training image based on the first training image, a color tag associated with the image, and the mask;

providing, by the color transformer network, the first training image, a first object tag, the target color, the second training image, a second object tag, and the color tag to a paired adversarial discrimination network to determine if the first and second training images are a positive pair or a negative pair; and training the color transformer network to learn updated transformations using an adversarial loss based on the determination of the paired adversarial discrimination network, which outputs a positive result if the color tag and the target color match object colors of their respective images and if the first object tag and the second object tag match.

18. The computer-implemented method of claim 17, further comprising:

searching an image library using at least one object tag-color pair to obtain a first set of images;

performing object detection on each image in the first set of images to identify a second set of images that match the at least one object tag-color pair;

generating a mask for each image in the second set of images; and storing the training image set comprising the second set of images and a corresponding set of masks.

19. The computer-implemented method of claim 17, wherein if the color tag and the target color do not match the object colors of their respective images or if the first object tag and the second object tag do not match then the paired discriminator network outputs a negative result.

20. The computer-implemented method of claim 17, wherein training the color transformer network based on the determination of the adversarial discrimination network, further comprises:

updating the color transformer network using a cycle loss based on a difference between the second training image and the image from the training image set.

\* \* \* \* \*